United States Patent
Endo et al.

(10) Patent No.: US 7,915,753 B2
(45) Date of Patent: Mar. 29, 2011

(54) POWER SUPPLY APPARATUS AND VEHICLE

(75) Inventors: Yasuhiro Endo, Okazaki (JP); Ryoji Mizutani, Nishikamo-gun (JP); Eiji Yamada, Owariasahi (JP); Kazutaka Tatematsu, Nagoya (JP); Yasuaki Tahara, Nagoya (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 91 days.

(21) Appl. No.: 12/300,092

(22) PCT Filed: May 15, 2007

(86) PCT No.: PCT/JP2007/060318
§ 371 (c)(1),
(2), (4) Date: Nov. 7, 2008

(87) PCT Pub. No.: WO2007/132941
PCT Pub. Date: Nov. 22, 2007

(65) Prior Publication Data
US 2009/0205897 A1 Aug. 20, 2009

(30) Foreign Application Priority Data
May 17, 2006 (JP) .................. 2006-137916

(51) Int. Cl.
*B60L 1/00* (2006.01)
(52) U.S. Cl. ...................................... 307/10.1

(58) Field of Classification Search .................. 307/10.1, 307/326, 10.7; 180/68.5
See application file for complete search history.

(56) References Cited

U.S. PATENT DOCUMENTS

| | | | |
|---|---|---|---|
| 4,818,010 A * | 4/1989 | Dillon | 296/37.7 |
| 5,584,052 A * | 12/1996 | Gulau et al. | 455/79 |
| 6,668,963 B2 * | 12/2003 | Nada | 180/279 |
| 2002/0017405 A1 | 2/2002 | Nada | |
| 2004/0038123 A1 * | 2/2004 | Hisamitsu et al. | 429/147 |

FOREIGN PATENT DOCUMENTS

| | | |
|---|---|---|
| JP | 09-207685 A | 8/1997 |
| JP | 11-268545 A | 10/1999 |
| JP | 11-273982 A | 10/1999 |
| JP | 11-273983 A | 10/1999 |
| JP | 2001-61201 A | 3/2001 |
| JP | 2001-320801 A | 11/2001 |
| JP | 2004-066889 A | 3/2004 |
| JP | 2004-158306 A | 6/2004 |
| JP | 2006-73368 A | 3/2006 |

* cited by examiner

*Primary Examiner* — Jared J Fureman
*Assistant Examiner* — Daniel Cavallari
(74) *Attorney, Agent, or Firm* — Kenyon & Kenyon LLP

(57) ABSTRACT

A battery is arranged outside a compartment. A service plug is arranged in the compartment. The service plug is a shutoff device that can shut off an output path of the battery by a manual operation. When a vehicle is hard hit at the front and a circuit of PCU is damaged, an excessive current may flow to the PCU, possibly generating heat or smoke from the PCU. When the vehicle goes wrong, a person on board the vehicle may pull out the service plug, whereby the power supply path from battery to PCU can be shut off.

14 Claims, 5 Drawing Sheets

SERVICE PLUG: ATTACHED

SERVICE PLUG: DETACHED

POWER SUPPLY APPARATUS AND VEHICLE

This is a 371 national phase application of PCT/JP2007/060318 filed 15 May 2007, claiming priority to Japanese Patent Application No. 2006-137916 filed 17 May 2006, the contents of which are incorporated herein by reference.

TECHNICAL FIELD

The present invention relates to a power supply apparatus and a vehicle mounting the power supply apparatus.

BACKGROUND ART

Conventionally, electric vehicles, hybrid vehicles and fuel cell vehicles that run using electric motor as a driving source have been known. In such a vehicle, a battery is mounted for supplying electric power as the energy to the electric motor.

A lithium ion secondary battery that can achieve high energy density and high output density has been developed and used as a large-capacity power source for a hybrid vehicle or an electric vehicle. When the lithium ion secondary battery is used in a hybrid vehicle or an electric vehicle, a plurality of unit batteries (battery cells) are connected in series, to ensure high output.

When the batteries are connected by means of a connecting member, however, battery output decreases because of electric resistance of the connecting member. Further, the larger the volume occupied by the connecting member with respect to the volume of batteries as a whole, the lower the output density or energy density of the batteries.

A bipolar battery is one of the batteries that can be a solution to such a problem, and it enables reduction in resistance between battery cells and reduction in size. A bipolar battery generally has a structure in which a plurality of bipolar electrodes are stacked with an electrolyte interposed. Here, a bipolar electrode means an electrode having a collector member formed as a sheet, with positive electrode active material provided on one surface and negative electrode active material provided on the other surface, of the collector member. The bipolar secondary battery may have various shapes, and as an example, it has a thin plate shape.

Japanese Patent Laying-Open No. 2004-158306 discloses, as an example of such a bipolar battery, a solid polymer battery in which positive and negative electrodes containing polymer electrolyte are provided on opposite sides of a solid polymer electrolyte layer. The solid polymer battery is characterized in that, at portions close to the collector of positive and/or negative electrode, the polymer electrolyte is gelatinized, and at portions closer to the solid polymer electrolyte of positive and/or negative electrode, the polymer electrolyte is fully solidified. Japanese Patent Laying-Open No. 2004-158306 discloses that the battery is housed below the seat at the central portion of a vehicle, in an engine room or inside the roof.

At the time of a car accident, for example, when the vehicle body is hard-hit, various electric circuits operating with the electric power supplied from the battery may possibly fail. If electric power should be supplied from the battery to a broken electric circuit, excessive current would flow through the broken electric circuit, possibly generating heat or smoke from the circuit.

It is often the case that a vehicle has a controller that suspends or limits charging/discharging of battery when abnormality is detected. Namely, in case of vehicle malfunction or accident, an output path of power supply circuit including the secondary battery is automatically shut off. At the time of an accident, however, the controller itself could be broken.

Therefore, it is preferred that the vehicle has a device (or a method) that can shut off the output path of power supply circuit including the secondary battery at the time of vehicle malfunction or accident, in addition to the controller such as described above. Japanese Patent Laying-Open No. 2004-158306, however, does not disclose any method of shutting off the output path of secondary battery at the time of vehicle malfunction or accident.

DISCLOSURE OF THE INVENTION

An object of the present invention is to provide a power supply apparatus allowing a person on board the vehicle to easily shut off the output path of power supply circuit, as well as to provide a vehicle provided with the power supply apparatus.

In short, the present invention provides a power supply apparatus, mounted on a vehicle having a vehicle body including a roof and a window frame, with a ceiling provided inside the vehicle body to form a compartment. The power supply apparatus includes a power supply circuit arranged between the roof and the ceiling, and a shutoff device arranged in the compartment, allowing shutoff of an output path of the power supply circuit by a manual operation.

Preferably, the shutoff device is arranged between an area of the ceiling corresponding to the power supply circuit and the window frame, at a portion closer to the window frame.

More preferably, the shutoff device is arranged close to an upper edge of the window frame.

More preferably, the window frame is provided on a side of the vehicle. A pillar constituting a column of the window frame is provided at a central portion of the side of the vehicle. The shutoff device is provided at an upper portion of the pillar.

Preferably, the shutoff device includes a connecting member attached to first and second terminals provided in series on the output path for electrically connecting the first and second terminals, and removable from the first and second terminals by the manual operation.

Preferably, the shutoff device is a service plug.

Preferably, the power supply circuit includes a secondary battery.

More preferably, the secondary battery is a bipolar battery.

According to another aspect, the present invention provides a vehicle, including a vehicle body including a roof and a window frame, a ceiling for forming a compartment inside the vehicle, a power supply circuit arranged between the roof and the ceiling, and a shutoff device arranged in the compartment, allowing shutoff of an output path of the power supply circuit by a manual operation.

Preferably, the shutoff device is arranged between an area of the ceiling corresponding to the power supply circuit and the window frame, at a portion closer to the window frame.

More preferably, the shutoff device is arranged close to an upper edge of the window frame.

More preferably, the window frame is provided on a side of the vehicle. A pillar constituting a column of the window frame is provided at a central portion of the side of the vehicle. The shutoff device is provided at an upper portion of the pillar.

More preferably, the shutoff device includes a connecting member attached to first and second terminals provided in series on the output path for electrically connecting the first and second terminals, and removable from the first and second terminals by the manual operation.

More preferably, the shutoff device is a service plug.

Preferably, the power supply circuit includes a secondary battery.

More preferably, the secondary battery is a bipolar battery.

Therefore, according to the present invention, at the time of vehicle malfunction or accident, it is possible for a person on board the vehicle to easily shut off the output path of power supply circuit.

BEST MODES FOR CARRYING OUT THE INVENTION

Figure 1:
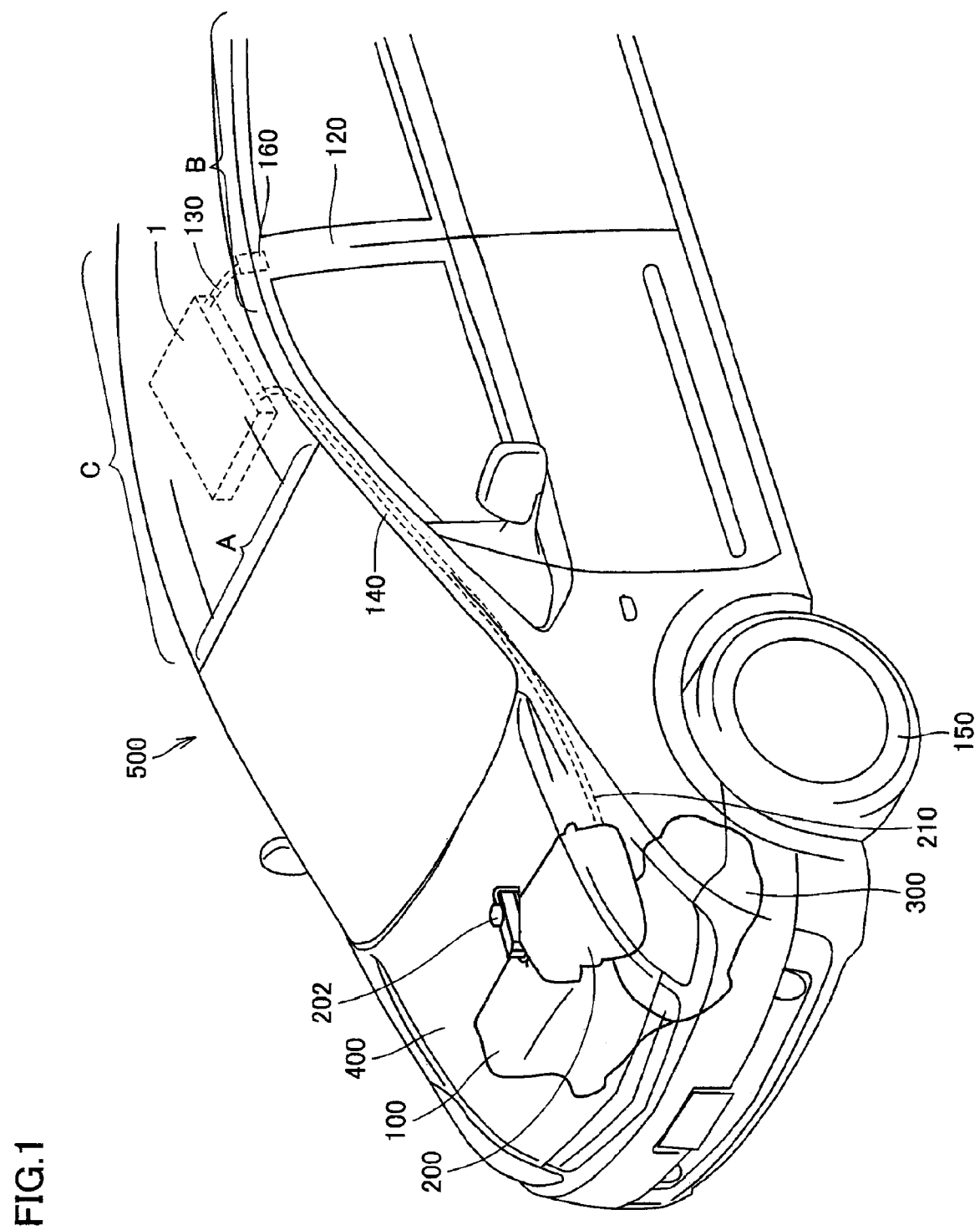
FIG. 1 is a perspective view of a vehicle mounting the power supply apparatus in accordance with an embodiment.

In the following, an embodiment of the present invention will be described in detail with reference to the figures. In the figures, the same reference characters denote the same or corresponding portions.

FIG. 1 is a perspective view of the vehicle mounting the power supply apparatus in accordance with the present embodiment. Though a hybrid vehicle is shown as an example of the vehicle in FIG. 1, the vehicle on which the power supply apparatus in accordance with the present embodiment is mounted may be an electronic vehicle or a fuel cell vehicle.

Referring to FIG. 1, in an engine room of a vehicle 500, an engine 100, a PCU 200, and a front transaxle 300 are provided. Further, vehicle 500 is provided with a battery 1 and a service plug 160. Battery 1 and service plug 160 constitute the power supply apparatus of the present invention. Though battery 1 and service plug 160 are connected by a cable 130 in FIG. 1, service plug 160 may directly be connected to battery 1.

An output shaft of engine 100 is connected to an input shaft of front transaxle 300. A motor (not shown) for driving the vehicle is provided in front transaxle 300.

The motor drives with the electric power supplied from battery 1 through PCU 200. Further, a power split mechanism (not shown) is provided in front transaxle 300. This switches mechanical power of the engine and mechanical power of the motor, whereby the motor assists the mechanical power of engine 100 or only the motor generates the mechanical power.

An output shaft of front transaxle 300 is connected to a tire 150 through a drive shaft (not shown). Vehicle 500 runs with the mechanical power transmitted from front transaxle 300 to tire 150.

PCU 200 has electric components such as an inverter unit and a boost converter provided therein. In order to supply electric power from battery 1 to PCU 200, battery 1 and PCU 200 are connected by a cable 210. Cable 210 passes through a space in a front pillar (A-pillar) 140.

In PCU 200, there is a reservoir tank 202 of a cooling water circulated inside the PCU 200. Reservoir tank 202 is provided at a portion upper than engine 100, so as to facilitate operation of pouring cooling water. There is a hood 400 for covering the top of engine room.

Battery 1 is placed outside the compartment. Specifically, battery 1 is placed between the roof and the ceiling of compartment of vehicle 500. Service plug 160 is provided in the compartment. Specifically, service plug 160 is placed between the ceiling area corresponding to the battery and a window frame, at a portion closer to the window frame. For instance, service plug 160 is placed close to an upper edge of front window frame (area A), close to an upper edge of side window frames (areas B, C), or close to an upper edge of rear window frame (not shown). Areas B and C denote areas above the side windows positioned on the right and on the left, respectively, when viewed from the front side of the vehicle.

FIG. 1 shows an exemplary arrangement of service plug 160, in which service plug 160 is placed above a center pillar (B-pillar) 120. The center pillar refers to the pillar positioned at the center of the side of vehicle 500. As shown in FIG. 1, the center pillar constitutes the pillar of side window frame.

Service plug 160 is a shutoff device that can be manually operated to shut off the output path of battery 1. As will be described later, service plug 160 is attached to the socket. The output path of battery 1 is shut off when a person on board the vehicle pulls the service plug out from the socket. Namely, power supply from battery 1 to PCU 200 is shut off.

Assume that the front side of vehicle 500 is hard hit and the circuit of PCU 200 is damaged. In such a case, excessive current would flow to PCU 200, possibly generating heat or smoke from PCU 200. When the person on board the vehicle pulls out the service plug 160 at the time of malfunction or accident of vehicle 500, the power supply path (output path of battery 1) from battery 1 to PCU 200 can be shut off. Thus, such a problem can be prevented by the present embodiment.

If a person in the vehicle cannot pull out the plug at the time of malfunction or accident of the vehicle, a person outside the vehicle 500 may break the window and pull out the service plug 160.

It is necessary to minimize the possibility that service plug 160 is pulled out by mistake by a person on board (for example, the service plug is pulled out by a mischievous child). By arranging the service plug 160 closer to the upper edge of the window frame as described above, possibility of one's hand touching the service plug 160 lowers.

Next, the arrangement of battery 1 will be described.

Figure 2:
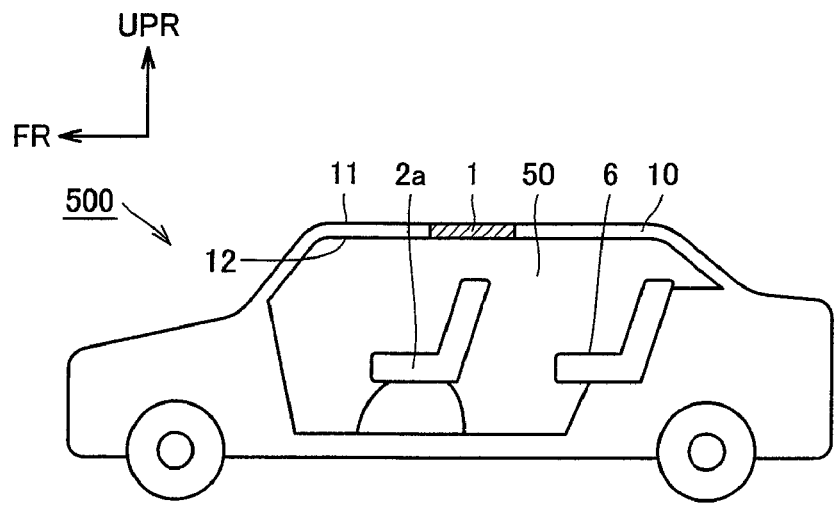
FIG. 2 is a schematic cross-section of a vehicle 500 shown in FIG. 1.

FIG. 2 is a schematic cross-section of a vehicle 500 shown in FIG. 1.

Referring to FIG. 2, in a boarding space (compartment) 50 of vehicle 500, a front seat 2a and a rear seat 6 are arranged. Battery 1 is arranged between a space 10 between a roof 11 of vehicle 500 and a ceiling 12 of compartment 50. Specifically, battery 1 is placed outside of compartment 50.

Battery 1 is a bipolar battery. Generally, a bipolar battery has a plurality of bipolar electrodes stacked one after another with an electrolyte interposed. The bipolar battery is formed to have a flat shape. The larger the area of the flat body, the larger becomes the battery capacity. Detailed structure of battery 1 (bipolar battery) will be described later.

By adopting a bipolar battery as battery 1, it becomes possible to mount a secondary battery having small size and large capacity. Since the bipolar battery is small, it may be housed in a space below a trunk room or engine room. In other words, use of battery 1 eases constraints on the arrangement of the battery in vehicle 500.

It is preferred, however, that the bipolar battery is arranged in space 10 as shown in FIG. 2. This allows housing of battery 1 without significantly changing the structure of vehicle body.

Roof 11 receives solar heat and radiates the heat to space 10. When the bipolar battery is placed in space 10, it is possible to heat the bipolar battery by the solar heat.

A bipolar battery having solid electrolyte (or gel electrolyte) operates better when the temperature around the bipolar battery is higher to some extent (for example 60° C. or higher). When the bipolar battery is placed in space 10, it is possible to heat the bipolar battery to a preferable operation temperature. Therefore, it is possible to heat the bipolar battery when vehicle 500 is used in a cold region, without additionally providing a heater for heating the bipolar battery.

Figure 3:
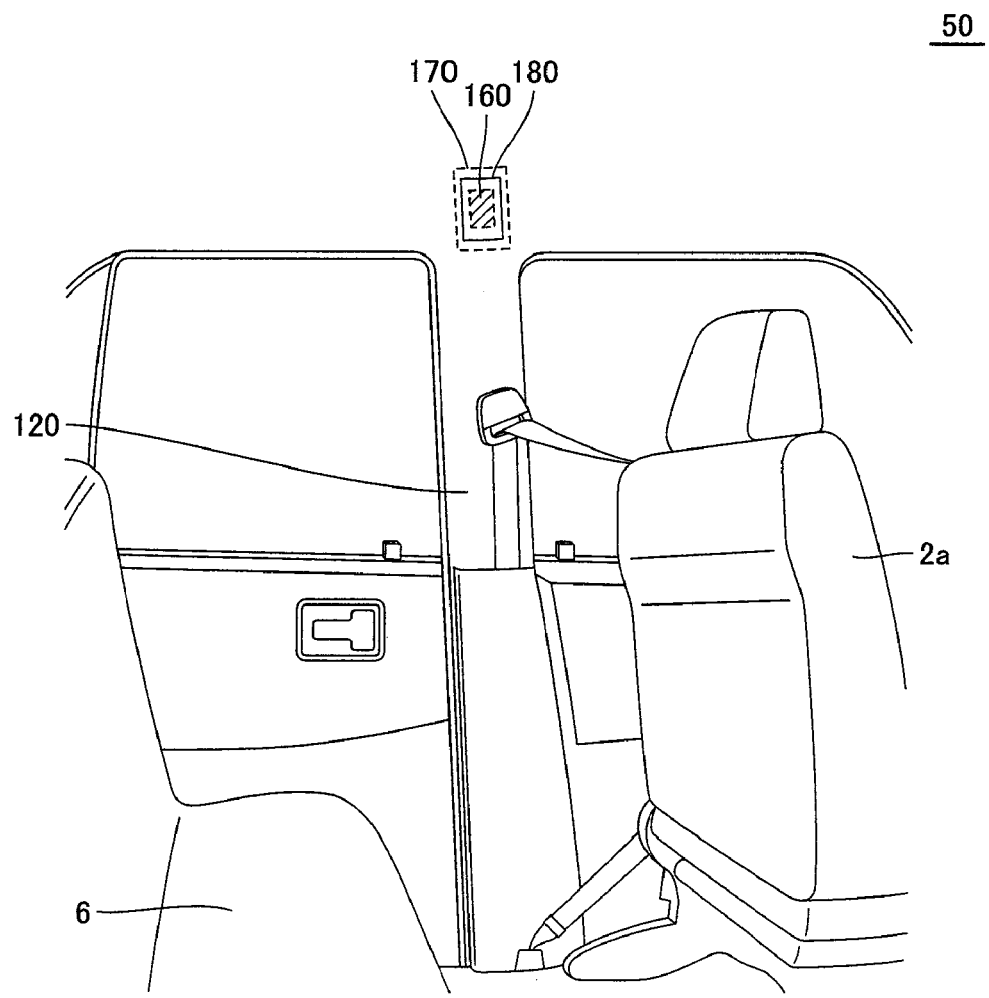
FIG. 3 shows, in greater detail, the portion where the service plug is housed, in a compartment 50 shown in FIG. 2.

FIG. 3 shows, in greater detail, the portion where the service plug is housed, in a compartment 50 shown in FIG. 2.

Referring to FIG. 3, at an upper portion of center pillar 120 in compartment 50, a housing unit 170 for housing service plug 160 is provided. Further, a lid 180 that opens and closes housing unit 170 is provided, so that service plug 160 is not visible to a person on board the vehicle. A person seated on front seat 2a or rear seat 6 opens lid 180 and pulls out service plug 160 in housing unit 170 at the time of malfunction or accident of the vehicle. Thus, the output path of battery 1 shown in FIG. 1 is shut off.

Figure 4:
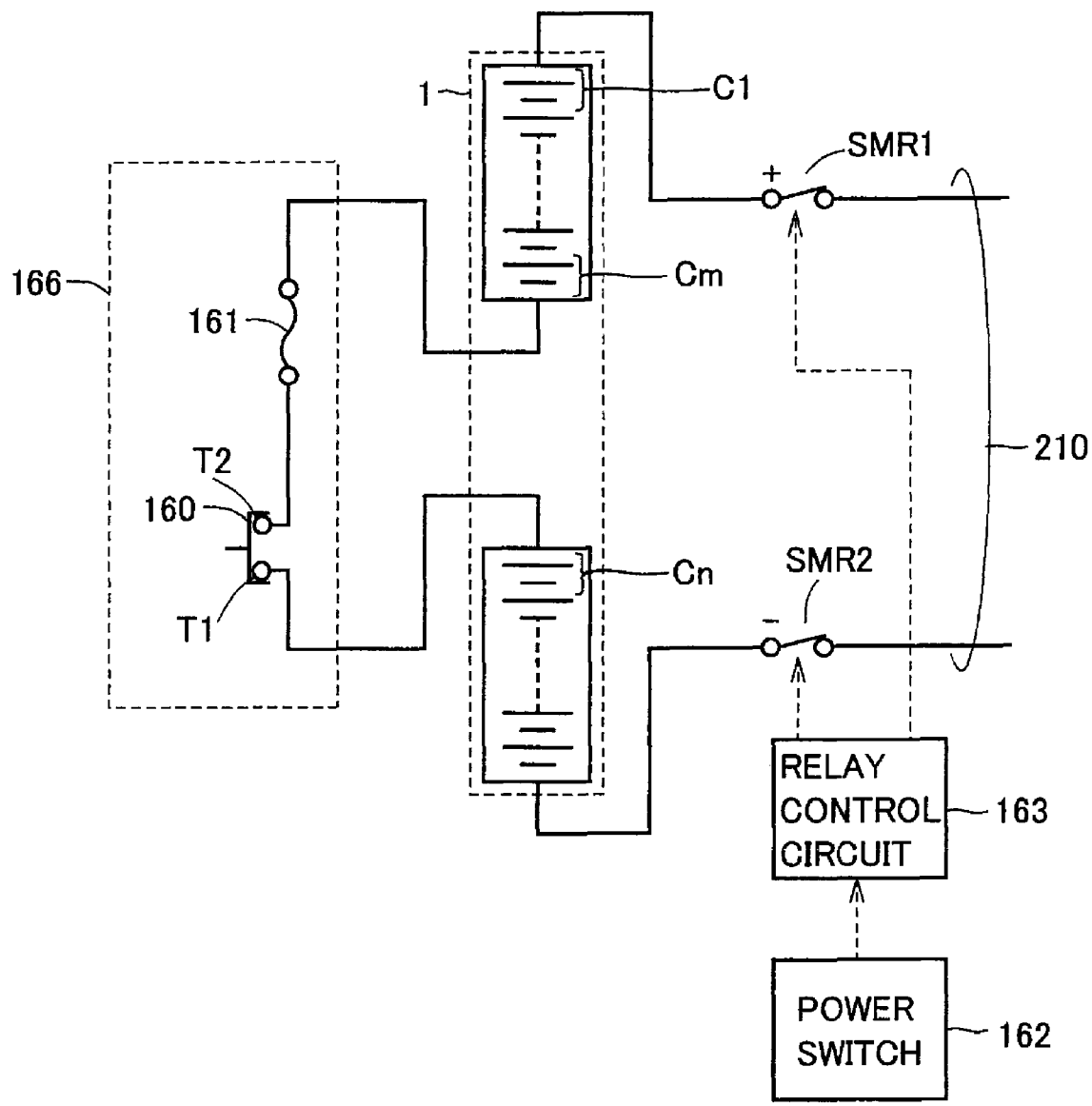
FIG. 4 is a circuit diagram including a battery 1 and a service plug 160 shown in FIG. 1.

FIG. 4 is a circuit diagram including a battery 1 and a service plug 160 shown in FIG. 1.

Referring to FIG. 4, battery 1 is formed of a plurality of battery cells C1 connected in series. Among the battery cells connected in series, a fuse 161 and service plug 160 are provided between neighboring battery cells Cm and Cn.

One end of fuse 161 is connected to a negative electrode of battery cell Cm. Between the other end of fuse 161 and the positive electrode of battery cell Cm, service plug 160 is provided. Service plug 160 and fuse 161 are attached to a socket 166.

When service plug 160 is attached to socket 166, terminals T1 and T2 are electrically connected by service plug 160. Consequently, the plurality of battery cells in battery 1 are connected in series, and a high voltage is output to cable 210. When service plug 160 is detached, terminals T1 and T2 are electrically disconnected. Therefore, the high voltage is not output to cable 210 connected to battery 1.

Along the current path between the positive electrode terminal of battery 1 and cable 210, a system main relay SMR 1 is provided, and along the current path between the negative electrode path of battery 1 and cable 210, a system main relay SMR2 is provided. When a power switch (main switch) 162 is on, system main relays SMR1 and SMR2 are turned on by a relay control circuit 163. Thus, battery 1 and cable 210 are connected. When power switch 162 is off, system main relays SMR1 and SMR2 are turned off by relay control circuit 163. Thus, the output path from battery 1 to cable 210 is shut off.

Power switch 162 is provided in the compartment and operated by the driver. In the present embodiment, in addition to power switch 162, service plug 160 is provided in the compartment as a device that can shut off the output path of battery 1 by a manual operation of a person on board the vehicle. Therefore, even in such a situation that the output path of battery 1 cannot be shut off by the operation of power switch 162 because of failure of relay control circuit 163 in case of an accident of the vehicle, the output path of battery 1 can be shut off by a person on board the vehicle pulling out the service plug 160.

Figure 5A:
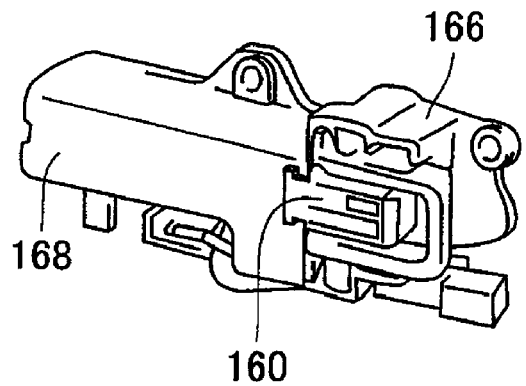
FIG. 5A is a specific illustration of service plug 160 attached to a socket 166.
Figure 5B:
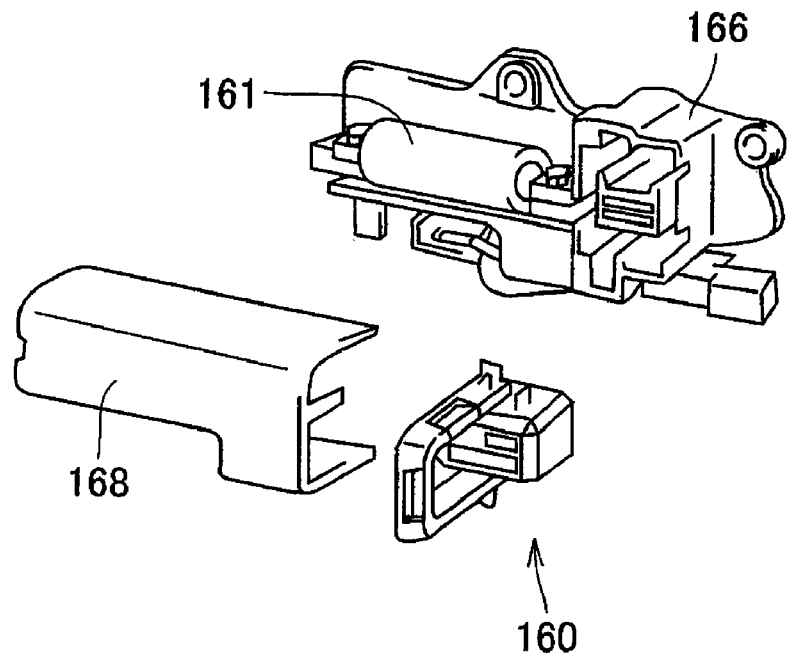
FIG. 5B is a specific illustration of service plug 160 detached from socket 166.

As shown in FIG. 5A, service plug 160 is attached to socket 166, and fuse 161 is covered with a cover 168. When service plug 160 is attached to socket 166, a plurality of battery cells are connected in series inside the battery, as shown in FIG. 4. Further, as shown in FIG. 5B, when service plug 160 is detached from socket 166, the plurality of battery cells are disconnected.

Next, the bipolar battery (battery 1 of FIG. 1) will be described in greater detail.

Figure 6:
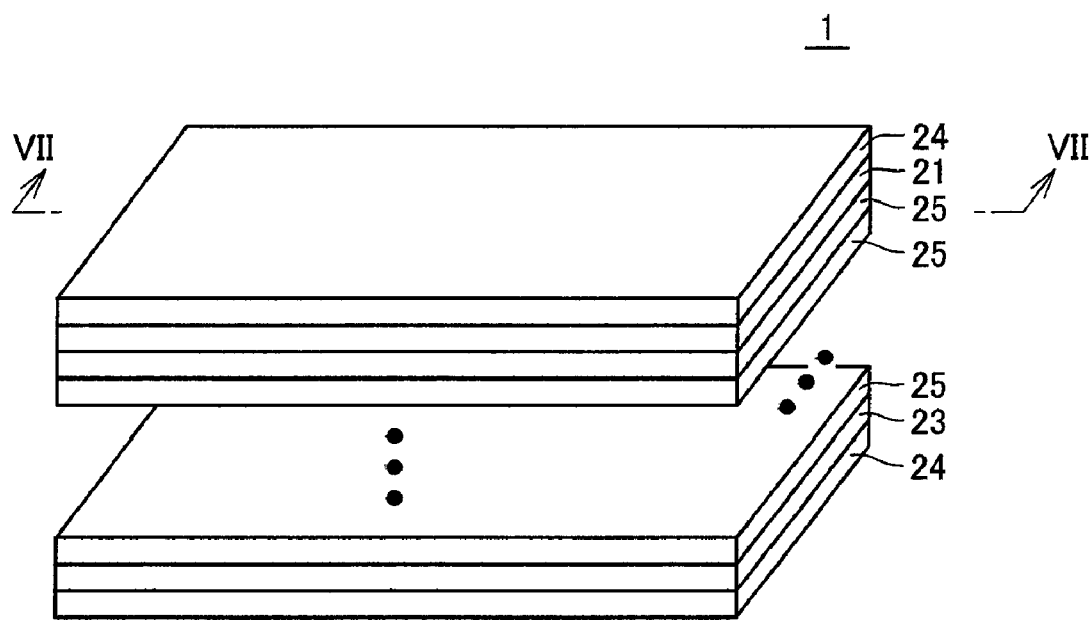
FIG. 6 is a perspective view showing battery 1 of FIG. 1.

FIG. 6 is a perspective view showing battery 1 of FIG. 1.

Referring to FIG. 6, battery (bipolar battery) 1 is formed by stacking a plurality of battery cells 25. Battery 1 has an approximately rectangular parallelepiped shape.

Figure 7:
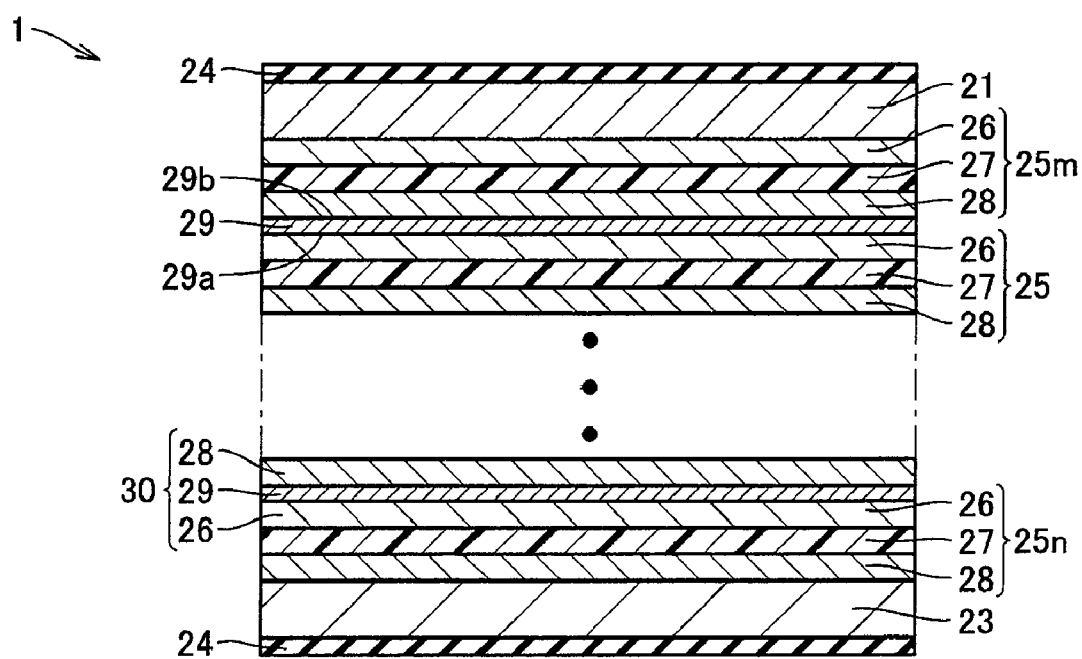
FIG. 7 is a cross-sectional view taken along the line VII-VII of FIG. 6.

FIG. 7 is a cross-sectional view taken along the line VII-VII of FIG. 6.

Referring to FIGS. 6 and 7, electrode cell 25 consists of a positive electrode active material layer 28 serving as the positive electrode, a negative electrode active material layer 26 serving as the negative electrode, and an electrolyte layer 27 posed between positive electrode active material layer 28 and negative electrode active material layer 26. Electrolyte layer 27 is formed of a material having ion conductivity. Electrolyte layer 27 may be a solid electrolyte, or gelled electrolyte. By interposing electrolyte layer 27, smooth ion conduction between positive electrode active material layer 28 and negative electrode active material layer 26 becomes possible, improving output of the bipolar battery.

The plurality of electrode cells 25 are stacked such that positive electrode active material layer 28 and negative electrode active material layer 26 oppose to each other at positions where the layers extend next to each other in the stacking direction. Between each of the plurality of electrode cells 25, a sheet type collector foil 29 is provided. Positive electrode active material layer 28 is formed on one surface 29b and negative electrode active material layer 26 is formed on the other surface 29a, of collector foil 29. Positive electrode active material layer 28 and negative electrode active material layer 26 are formed, for example, by sputtering on the surfaces of collector foil 29.

A set of positive electrode active material layer 28, collector foil 29 and negative electrode active material layer 26 arranged between electrolyte layers 27 adjacent to each other in the stacking direction of electrode sheets 25 constitute a bipolar electrode 30. In the bipolar battery, both the positive electrode active material layer 28 serving as the positive electrode and the negative electrode active material layer 26 serving as the negative electrode are formed in one bipolar electrode 30.

The plurality of electrode cells 25 include an electrode cell 25m positioned on the side closest to a negative electrode collector plate 21 and an electrode cell 25n positioned on the side closest to a positive electrode collector plate 23. Electrode cell 25m is provided such that negative electrode active material layer 26 is arranged at the end on the side of negative electrode collector plate 21. Electrode cell 25n is provided such that positive electrode active material layer 28 is arranged at the end on the side of positive electrode collector plate 23. Thus, negative electrode collector plate 21 is in contact with negative electrode active material layer 26 of electrode cell 25m, and positive electrode collector plate 23 is stacked to be in contact with positive electrode active material layer 28 of electrode cell 25n.

An insulating film 24 is stacked to be in contact with the surface of negative electrode collector plate 21. Further, insulating film 24 is stacked to be in contact with the surface of positive electrode collector plate 23. Therefore, even when the bipolar battery 2 is arranged in space 10 shown in FIG. 2, the vehicle body is insulated from the bipolar battery.

Next, materials forming the bipolar battery of FIGS. 6 and 7 will be described in detail. Collector foil 29 is formed, for example, of aluminum. Here, even if the active material layer provided on the surface of collector foil 29 contains solid polymer electrolyte, it is possible to ensure sufficient mechanical strength of collector foil 29. Collector foil 29 may be formed by providing aluminum coating on metal other than aluminum such as copper, titanium, nickel, stainless steel (SUS) or an alloy of these metals.

Positive electrode active material layer 28 includes a positive electrode active material layer and a solid polymer electrolyte. Positive electrode active material layer 28 may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the positive electrode active material, composite oxide of lithium and transition metal generally used in a lithium ion secondary battery may be used. Examples of the positive electrode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are phosphate compound or sulfated compound of transition metal and lithium such as $LiFePo_4$; oxide or sulfide of transition metal and lithium such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of positive electrode active material layer 28 and negative electrode active material layer 26. More preferably, the solid polymer electrolyte is included both in positive electrode active material layer 28 and negative electrode active material layer 26.

As the supporting electrolyte, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Negative electrode active material layer 26 includes a negative electrode active material layer and a solid polymer electrolyte. Negative electrode active material layer may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the negative electrode active material, a material generally used in a lithium ion secondary battery may be used. If a solid electrolyte is used, however, it is preferred to use a composite oxide of carbon or lithium and metal oxide or metal, as the negative electrode active material layer. More preferably, the negative electrode active material layer is formed of a composite oxide of carbon or lithium and transition metal. Further preferably, the transition metal is titanium. Specifically, it is more preferred that the negative electrode active material layer is of a composite oxide of titanium oxide or titanium and lithium.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting salt (lithium salt) for ensuring ion conductivity. As the supporting salt, $LiBF_4$, $LiPF_6$, $LiN(SO_2CF_3)_2$, $LiN(O_2C_2F_5)_2$ or a mixture of these may be used.

Specific examples of materials for positive electrode active material layer 28, negative electrode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Positive electrode material | Negative electrode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder: mix P(EO/EM) + $LiBF_4$ to positive electrode |
| $Li_{0.33}MnO_2$ | Li metal | P(EO/EM/AGE) | electrolyte salt: LiTFSI<br>ion conducting material binder: mix PEO-based solid polymer + LiTFSI to positive electrode |
| $Li_{0.33}MnO_2$ | Li metal | PEO base + inorganic additive | electrolyte salt: $LiClO_4$<br>ion conducting material: mix KB + PEG + LiTFSI to positive electrode |
| — | — | PEG-PMMA + PEG-borate ester | electrolyte salt: LiTFSI, BGBLi |
| — | — | PEO base + 10 mass % $0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material: mix KB + PVdF + PEG + LiTFSI to positive electrode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material: mix KB + PVdF + PEG + LiTFSI to positive electrode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to positive electrode |
| — | — | PME400 + Group 13 metal alkoxide (as Lewis acid) | electrolyte salt: LiCl |
| — | — | matrix containing poly (N-methylvinylimidazoline) (PNMVI) | electrolyte salt: $LiClO_4$ |

TABLE 1-continued

| Positive electrode material | Negative electrode material | Solid electrolyte | Remarks |
|---|---|---|---|
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>positive electrode conducting material KB + binder PVdF |
| $LiCoO_2$ | Li metal | P(EO/EM) + ether based plasticizer | electrolyte salt: LiTFSI<br>positive electrode conducting material KB + binder PVdF |

TABLE 2

| Positive electrode material | Negative electrode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$<br>($Li_2S$—$P_2S_5$ based glass ceramics) | state: glass<br>forming method: mechanochemical |
| — | — | $xSrTiO_3 \cdot (1-x)LiTaO_3$<br>(perovskite type oxide) | state: ceramics |
| $LiCoO_2$ | Li—In metal | $Li_{3.4}Si_{0.4}P_{0.6}S_4$<br>(thio-LISICON Li ion conductor) | state: ceramics |
| — | — | $(Li_{0.1}La_{0.3})_xZr_yNb_{1-y}O_3$<br>(perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$<br>(thio-LISICON Li ion conductor) | state: ceramics |
| — | Li metal<br>In metal | $0.01Li_3PO_4$—$0.63Li_2S$—$0.36SiS_2$<br>(thio-LISICON Li ion conductor) | state: ceramics |
| $LiCoO_2$ $LiFePO_4$<br>$LiMn_{0.6}Fe_{0.4}PO_4$ | Li metal<br>$V_2O_5$ | $Li_3PO_{4-x}N_x$(LIPON)<br>(lithium phosphate oxinitride glass) | state: glass |
| $LiNi_{0.8}Co_{0.15}Al_{0.05}O_2$ | Li metal | $Li_3InBr_3Cl_3$<br>(rock salt type Li ion conductor) | state: ceramics |
| — | — | $70Li_2S \cdot (30-x)P_2S_5 \cdot xP_2O_5$<br>($Li_2S$—$P_2S_5$—$P_2O_5$ based glass ceramics) | state: glass |
| $LiCoO_{2\ etc.}$ | Li metal<br>Sn based oxide | $Li_2O$—$B_2O_3$—$P_2O_5$ base, $Li_2O$—$V_2O_5$—$SiO_2$ base,<br>$Li_2O$-$TiO_2$—$P_2O_5$ base, LVSO etc. | state: glass |
| — | — | $LiTi_2(PO_3)_4$(LTP)<br>(NASICON type structure) | state: ceramics |

TABLE 3

| Positive electrode material | Negative electrode material | Polymer base | Remarks |
|---|---|---|---|
| Ni based collector lithium electrode | Li metal lithium electrode | acrylonitrile vinyl acetate<br>(PAN-VAc based gel electrolyte) | solvent: EC + PC<br>electrolyte salt: $LiBF_4$, $LiPF_6$, $LiN(CF_3SO_2)_2$ |
| | | triethylene glycolmethyl methacrylate<br>(polymethyl methacrylate (PMMA) based gel electrolyte) | solvent: EC + PC<br>electrolyte salt: $LiBF_4$ |
| $V_2O_5$/PPy composite body | Li metal | methyl methacrylate<br>(PMMA gel electrolyte) | solvent: EC + DEC<br>electrolyte salt: $LiClO_4$ |
| Li metal | Li metal | PEO/PS polymer blend gel electrolyte | solvent: EC + PC<br>electrolyte salt: $LiClO_4$ |
| Li metal | Li metal | alkylene oxide based polymer electrolyte | solvent: PC<br>electrolyte salt: $LiClO_4$ |
| Li metal & $LiCoO_2$ | Li metal | alkylene oxide based polymer electrolyte | solvent: EC + GBL<br>electrolyte salt: $LiBF_4$ |
| Li metal | Li metal | polyolefin based base polymer | solvent: EC + PC<br>electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC<br>electrolyte salt: $LiN(CF_3SO_2)_2$ |
| $LiCoO_2$ | Li metal | PEO based and acryl based polymer | solvent: EC + PC<br>electrolyte salt: $LiBF_4$ |
| Li metal | Li metal | trimethylol propane ethoxylate acrylate (ether based polymer) | solvent: PC<br>electrolyte salt: LiBETI, $LiBF_4$, $LiPF_6$ |
| — | — | EO-PO copolymer | electrolyte salt: LiTFSI, $LiBF_4$, $LiPF_6$ |

TABLE 3-continued

| Positive electrode material | Negative electrode material | Polymer base | Remarks |
|---|---|---|---|
| — | — | poly aziridine compound | solvent: EC + DEC<br>electrolyte salt: $LiPF_6$ |
| — | PAS (polyacene) | PVdF-HFP gel electrolyte | solvent: PC, EC + DEC<br>electrolyte salt: $LiClO_4$, $Li(C_2F_5SO_2)_2N$ |
| — | — | urea based lithium polymer gel electrolyte | solvent: EC + DMC<br>electrolyte salt: $LiPF_6$ |
| — | — | polyether/polyurethane based (PEO-NCO) gel electrolyte | solvent: PC<br>electrolyte salt: $LiClO_4$ |
| — | — | cross-linked polyalkylene oxide based gel polymer electrolyte | — |

As described above, according to the present embodiment, the service plug is arranged in the compartment of a vehicle. Therefore, at the time of malfunction or accident of the vehicle, a person on board the vehicle can pull out the service plug, to shut off the output path of the secondary battery.

In the present embodiment, a bipolar battery is used as the battery. Therefore, a small but high-capacity battery can be mounted on the vehicle. This increases the degree of freedom in arranging the battery in the vehicle.

Further, according to the present embodiment, the bipolar battery is arranged in a space between the roof and the ceiling of the vehicle (backside of compartment ceiling). Therefore, it is unnecessary to newly make a space in the vehicle to house the battery. Further, the bipolar battery can be heated by solar heat.

In the present embodiment, the position where the service plug is arranged is not limited to the portion close to the window frame (area A, B or C) of the compartment. For instance, a housing unit and a lid that opens and closes may be provided below a console box, and the service plug may be housed in the housing unit.

Further, though a service plug has been described as a shutoff device for shutting off the output path of the secondary battery in the present embodiment, the shutoff device in accordance with the present invention is not limited to a service plug, and various devices may be used. For example, a structure may be possible in which fuse 161 shown in FIG. 4 is pulled out by a person on board. Alternatively, in place of service plug 160 shown in FIG. 4, a button switch, or a push-turn switch (which is turned on if it is pushed and turned and turned off if it is turned back) may be used as the shutoff device.

Though a bipolar battery has been described in the present embodiment as the "power supply circuit" of the present invention, the "power supply circuit" of the present invention is not limited to the bipolar battery. By way of example, a device shutting off the output path of PCU 200 shown in FIG. 1 may be provided. In that case, PCU 200 corresponds to the "power supply circuit" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power supply apparatus, mounted on a vehicle having a vehicle body including a roof and a window frame, with a ceiling provided inside said vehicle body to form a compartment, comprising:
a power supply circuit arranged between said roof and said ceiling; and
a shutoff device arranged in said compartment, allowing shutoff of an output path of said power supply circuit by a manual operation,
wherein said shutoff device is arranged between an area of said ceiling corresponding to said power supply circuit and said window frame, at a portion closer to said window frame than to said power supply circuit.

2. The power supply apparatus according to claim 1, wherein
said shutoff device is arranged on an upper edge of said window frame.

3. The power supply apparatus according to claim 2, wherein
said window frame is provided on a side of said vehicle;
a pillar constituting a column of said window frame is provided at a central portion of the side of said vehicle; and
said shutoff device is provided at an upper portion of said pillar.

4. The power supply apparatus according to claim 1, wherein
said shutoff device includes
a connecting member attached to first and second terminals provided in series on said output path for electrically connecting said first and second terminals, and removable from said first and second terminals by said manual operation.

5. The power supply apparatus according to claim 1, wherein
said shutoff device is a service plug.

6. The power supply apparatus according to claim 1, wherein
said power supply circuit includes a secondary battery.

7. The power supply apparatus according to claim 6, wherein
said secondary battery is a bipolar battery.

8. A vehicle, comprising:
a vehicle body including a roof and a window frame;
a ceiling for forming a compartment inside said vehicle;
a power supply circuit arranged between said roof and said ceiling; and
a shutoff device arranged in said compartment, allowing shutoff of an output path of said power supply circuit by a manual operation,
wherein said shutoff device is arranged between an area of said ceiling corresponding to said power supply circuit and said window frame, at a portion closer to said window frame than to said power supply circuit.

9. The vehicle according to claim 8, wherein
said shutoff device is arranged on an upper edge of said window frame.

10. The vehicle according to claim 9, wherein
said window frame is provided on a side of said vehicle;

a pillar constituting a column of said window frame is provided at a central portion of the side of said vehicle; and said shutoff device is provided at an upper portion of said pillar.

11. The vehicle according to claim 8, wherein said shutoff device includes a connecting member attached to first and second terminals provided in series on said output path for electrically connecting said first and second terminals, and removable from said first and second terminals by said manual operation.

12. The vehicle according to claim 8, wherein said shutoff device is a service plug.

13. The vehicle according to claim 8, wherein said power supply circuit includes a secondary battery.

14. The vehicle according to claim 13, wherein said secondary battery is a bipolar battery.

* * * * *